United States Patent [19]

Chambert

[11] 4,232,633
[45] Nov. 11, 1980

[54] PROCESS AND REACTOR FOR CONDUCTING EXOTHERMAL REACTIONS IN A CIRCULATING FLUIDIZED BED

[76] Inventor: Lars A. A. Chambert, Vikingavägen 16, S-230 50 Bjärred, Sweden

[21] Appl. No.: 902,533

[22] Filed: May 3, 1978

[30] Foreign Application Priority Data

May 9, 1977 [SE] Sweden ............................... 7705352

[51] Int. Cl.³ ............................................... F22B 1/02
[52] U.S. Cl. .................................. 122/4 D; 110/245; 110/263; 431/7; 431/170
[58] Field of Search ............... 122/4 D; 110/245, 263; 431/7, 170

[56] References Cited

U.S. PATENT DOCUMENTS

| | | | |
|---|---|---|---|
| 2,818,049 | 12/1957 | Blaskowski et al. | 122/4 |
| 3,696,793 | 10/1972 | Bell | 122/4 |
| 3,893,426 | 7/1975 | Bryers | 122/4 |
| 3,910,235 | 10/1975 | Highley | 122/4 |
| 4,130,071 | 12/1978 | Porter | 122/4 |

*Primary Examiner*—Edward G. Favors
*Attorney, Agent, or Firm*—Karl W. Flocks

[57] ABSTRACT

This invention relates to a process and a reactor for conducting exothermal reactions, for instance combustion, between relatively heavy and relatively light phases in a circulating fluidized bed having vertical cooling surfaces for absorption of the reaction heat resulting from the reaction. The light phase is divided into a primary flow for maintaining a dense conventional part bed and a secondary flow for maintaining a less dense rapid part bed above the dense bed. Said rapid part bed is recycled outside the part beds to the dense part bed for producing the circulating bed. Solid phase is continuously supplied to and withdrawn from the circulating bed, and the secondary flow is supplied to the circulating bed mainly below the cooling surfaces. The introduction of the secondary flow into the circulating bed is arranged within the circulating bed and the secondary flow prior to the introduction into the circulating bed is divided into a plurality of part flows, at least some of which part flows are introduced into the circulating bed, directed preferably substantially horizontally from the bed to the lateral boundary walls thereof.

13 Claims, 4 Drawing Figures

PROCESS AND REACTOR FOR CONDUCTING EXOTHERMAL REACTIONS IN A CIRCULATING FLUIDIZED BED

This invention relates to a process and a reactor for conducting exothermal reactions, for example combustion for heating process media such as water for e.g. steam generation, in a circulating fluidized bed.

Lately, an increased interest in employing the technique of circulating fluidized beds has been noted. According to said technique a relatively heavy particulate solid or liquid phase is fluidized under upward transportation in a vertical reactor by means of a relatively light gaseous or liquid phase, and in the top of the reactor the relatively heavy phase is separated from the light phase and recirculated to the bottom of the reactor. As compared with the classical fluidized bed this technique is associated with high rates of flow and ensures, thanks to the intimate radial intermingling of the phases and the satisfactory turbulence in such a circulating bed, a uniform temperature distribution throughout the circulating bed.

The technique of circulating fluidized beds has primarily been exploited till now for conducting endothermal reactions, such as Al calcination, in which fuel supplied to the reactor is burnt and the heat thereof is utilized to conduct the endothermal reaction.

In experiments made to conduct exothermal reactions in a circulating fluidized bed difficulties are, however, encountered because the reactor cooling surfaces required for dissipating the heat of reaction interfere with the intimate intermingling of the phases supplied to the reactor that is required for supervisable reaction conditions, e.g. flow, load and temperature conditions.

The object of the present invention is to provide a process and a reactor for conducting one or more exothermal reactions between heavy and light phases in a circulating fluidized bed, said process and said apparatus permitting a simple supply of the phases to the reactor, a uniform intermingling of the phases throughout the reactor in spite of the cooling surfaces arranged therein, and a rapid and convenient control of parameters of operation, such as temperature, load and pressure in the reactor and heat absorption in the cooling surfaces.

According to the invention, substantially vertical cooling surfaces spaced apart from one another in the transverse direction of the reactor are provided in said reactor for taking up the heat of reaction from the exothermal reaction, e.g. combustion. To realize a good uniform intermingling of the phases supplied to the reactor, i.e. the solid or liquid phases and the gaseous phases, throughout the reactor and over the horizontal cross-section of the reactor, the invention provides for a uniform mixing of the phases and for uniform proportions between the phases before the phases in their upward movement reach the cooling surfaces. This is accomplished in that the lower parts of the vertical cooling surfaces terminate in the area of the relatively dense bed which in circulating fluidized beds prevails in the bottom section of the reactor and in that the relatively heavier phase consisting of recirculated and newly supplied parts, is introduced in said relatively dense bed and in that said relatively heavier phase is stirred together with relatively lighter phase in said relatively dense bed. In this way the reactor spaces between the vertical cooling surfaces will be supplied with homogeneous phase mixtures.

It is known that the heat transfer to cooling surfaces in a circulating fluidized bed apart from the rates of flow of the relatively heavier and relatively lighter phases depends also on the circulation of the relatively heavier phase or the average density displayed by the mixture of phases in the vicinity of the cooling surfaces as well as on the particle size of the material. This implies that at constant temperature in the reactor a variable heat transfer can be provided to the cooling surfaces by varying the circulation of material and in particular the lighter fine-grained portion of the heavier phase which is relatively readily conveyed by the gas flow.

In accordance with the invention, the circulation of material in the reactor is varied by dividing the gaseous flow required for the reaction into a primary flow and a secondary flow and by causing said flows to influence the fluidized bed in such a way that a greater or smaller portion of the relatively dense fluidized bed is driven in an upward direction in the reactor for recirculation to the dense bed. In this procedure the secondary flow is injected into the reactor at points inside the reactor which are situated above the point or points of injection for the primary flow but in the area of the relatively dense bed. By variation of the ratio of primary flow to secondary flow and the manner in which the secondary flow is injected the height and the contents of material of the dense bed and, as a consequence, the circulation of material are varied.

The secondary flow injection points are to advantage adjustable in vertical direction so that the secondary flow can act upon the relatively dense bed at different levels of the bed height. At a constant sum total of primary flow and secondary flow the circulation of material in the reactor and the heat absorption in the cooling surfaces can thus be varied.

It is realized that said injection arrangement also permits variation of the pressure drop over the reactor, which pressure drop is composed of the pressure drop over the relatively dense bed and that over the remaining part of the reactor height. It is also realized that the pressure drop is a technically important question as the power required to conduct the light phase through the reactor is largely determined by the reactor contents of heavy fluidized phase, and that it is therefore advantageous to be able to keep the thickness of the relatively dense bed at a minimum, which is made possible by the invention. Moreover, the invention makes it possible to so control the ratio of the primary gas flow to the secondary gas flow that the fine and coarse fractions of the supplied heavy phase are to a certain extent separated in that the primary gas flow is kept so low that the coarse material substantially remains in the bottom section of the reactor. One advantage gained thereby is that if the fine material is that which is mainly circulated, there is obtained both a good heat transfer and less relative erosion of the cooling surfaces, which are normally of metal, in the upper part of the bed.

If it is preferred to supply the various phases at the underside of the reactor and to provide in the top of the reactor one or more phase separators of the type described in my Swedish patent application No. 7613777-7, an optional number of individually drivable and controllable reactors can be erected in closely adjoining relationship. Such reactor assemblies can be utilized to advantage for steam generation and/or steam superheating in the vertical cooling surfaces.

An embodiment of the invention which deals with a combustion reaction between solid fuel and air for heating process media, such as water for e.g. steam generation, will be described in greater detail hereinbelow with reference to the accompanying schematic drawings in which.

Figure 1:
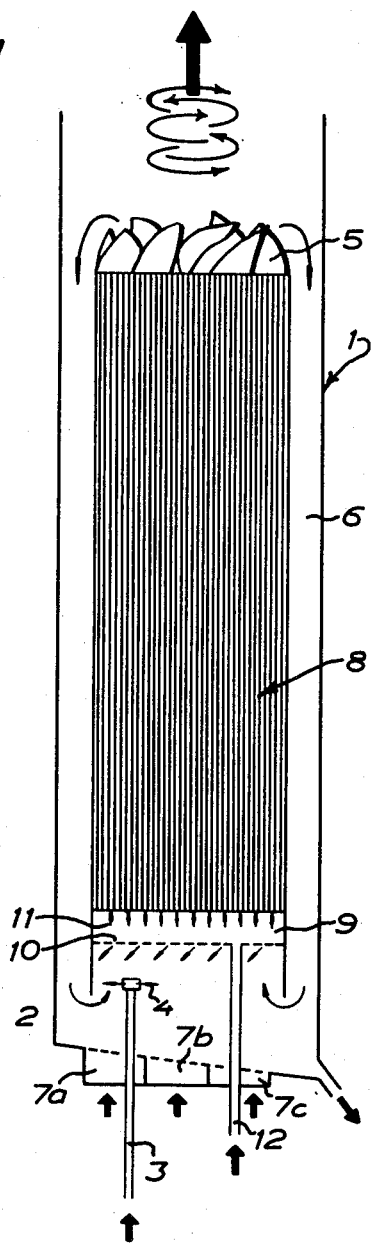
FIG. 1 shows a reactor fundamentally constructed in accordance with the present invention.

Finely divided fuel, such as coal, conveyed for instance by compressed air and containing optional additives for e.g. sulphur absorption, such as lime, and coming from a conventional coal crusher or mill, is supplied to the bottom section of the reactor 1 through one or more conduits 3 extending through the bottom of the reactor 2 and having in their upper parts lateral outlets 4 so that the fuel and the additives, if any, are injected substantially horizontally into the reactor. The injected fuel is caught by primary air injected through the bottom of the reactor and serving a combustion and fluidization purpose, and is conveyed in an upward direction in the reactor to a separator 5 which is adapted to separate gaseous phase, i.e. air and combustion gases, from solid material, i.e. burnt and unburnt fuel and fuel additives, said separator being preferably of the type described in my Swedish patent application No. 7613777-7. Such a separator consisting of vanes is advantageous inasmuch as it is in its entirety built into the reactor, as distinct from prior art cyclone arrangements. Separated solid material is recirculated to the bottom section of the reactor through a return passage 6. In its lower section the reactor has an outlet for solid material, substantially burnt fuel. A fluidized bed section which is relatively dense in relation to the upper part of the reactor is thereby maintained in a known manner at the bottom of the reactor. It should be observed in this connection that said laterally directed fuel outlets 4 should according to the invention be situated in the relatively dense fluidized bed section so that the fuel supply to the reactor will be satisfactorily and uniformly intermingled with the primary air in the dense bed throughout the reactor cross-section in said part of the reactor. The primary air is preferably injected through separate wind boxes 7a, 7b, 7c with separately variable primary air part flows, whereby a conveyance transversely of the reactor—if necessary, amplified to a rotary movement of the material in the bottom section—and a particularly satisfactory and rapid intermingling of the bed contents in said bed cross-section are obtained. In addition, it is advantageous to incline the reactor bottom somewhat, which also favours the vertical intermingling.

Vertical cooling surfaces 8 are arranged over or slightly countersunk in the relatively dense bed for taking up combustion heat. The cooling surfaces in this embodiment are tubes which contain the heated medium such as water or steam and extend in an upward direction substantially up to the separator 5. The tubes, which are for instance of U-shape, are assembled so as to form walls, for instance in the manner shown, and extend transversely of the reactor between the return conduits 6 and, in addition, can be welded so as to form dense walls in the manner conventional in the steam-boiler technique. Collection boxes and inlets and outlets for steam and water are not illustrated in the Figure. In FIG. 1 there is only shown one such vertical cooling surface 8, it being understood that several such cooling surfaces are arranged in spaced apart relation rearwardly and in front of the cooling surface illustrated. Suspension of the cooling surfaces can be effected according to methods known from the steam-boiler technique.

Wind boxes 9 for a secondary air flow are provided in the area of the upper part of the relatively dense fluidized bed. Said secondary air flow is the remainder of the air flow that, in addition to the primary air flow, is required for the desired combustion. The wind boxes 9 are disposed behind each other as are the cooling surfaces 8 and have uniformly distributed air exit openings 10, 11 in one or more of their boundary walls. Preferably, air exit openings 10, 11 are provided both in the upper boundary walls and in the bottom walls of the boxes, the bottom openings being preferably arranged in such a manner as to produce an obliquely downwardly directed air flow, whereby the secondary air exiting through said openings further improves the intimate intermingling of the solid material, i.e. newly added fuel and recirculated solid material, and air radially of the reactor in the relatively dense fluidized bed. Secondary air is supplied to the wind boxes 9 through supply conduits 12 which extend through the bottom 2 of the reactor, but can also extend through the reactor side-wall.

Figure 2:
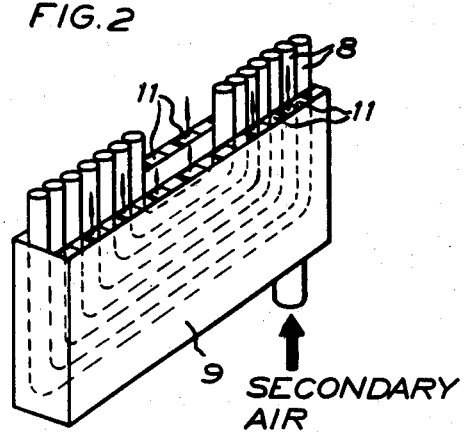
FIG. 2 is a perspective view of a wind box for secondary air with an inserted vertical cooling surface composed of tubes.
Figure 3:
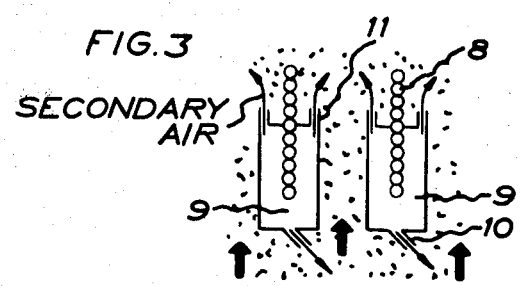
FIG. 3 is a section of two adjoining wind boxes with inserted cooling surfaces composed of tubes, as seen from the side in FIG. 1.

The lower portion of each cooling surface is suitably inserted at least to some part in its respective wind box 9 for secondary air. This will bring the advantage that the lower portions of said cooling surfaces are protected from abrasion by the aggressive solid particles. In FIG. 2 there is shown an arrangement for such insertion into a wind box 9 of U-shaped cooling tubes forming a vertical wall. In FIG. 3 there are shown two wind boxes 9 each having a vertical cooling surface composed of U-shaped tubes, and upper secondary air outlet openings 11.

By reason of the arrangement described in the foregoing the heat absorption in the cooling surfaces 8 will be varied by variation of the ratio of primary air flow to secondary air flow. Should for instance the primary air flow be increased in relation to the secondary air flow at constant supply of fuel, the relatively dense fluidized bed will expand in height and a greater amount of fuel will be caught and circulated round the interior of the reactor by the secondary air injected through the upper openings of the wind boxes. In the upper part of the reactor, between the cooling surfaces, there is thus obtained a greater material load and as a consequence an increased heat absorption in the cooling surfaces while maintaining a desired uniform reactor or combustion temperature at a constant total flow of primary and secondary air.

Figure 4:
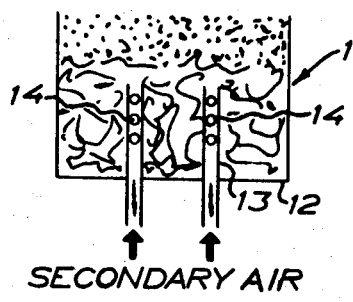
FIG. 4 shows an alternative or supplementary arrangement for secondary air supply.

Another arrangement for injecting secondary air is shown in FIG. 4. The secondary air is supplied to the vertical reactor through several tubes or passages 13 which extend essentially vertically through the bottom of the reactor and are movable in the direction of their longitudinal axes. Apertures 14 are provided in the walls of said tubes or passages 13 for injection of secondary air into the relatively dense fluidized bed in the reactor. By moving said tubes or passages upwardly or downwardly by means not shown the secondary air catches the solid material in the relatively dense bed respectively at a higher and a lower level of the vertical extension of the bed and as a result convey a smaller or greater amount of solid material upwardly and round the interior of the reactor. In this way the material load in the upper part of the reactor, i.e. the spaces between the cooling surfaces, and consequently the heat absorption in the cooling surfaces are varied.

Alternatively, the tubes or passages 13 may be immovably arranged and internally have movable slides or some other arrangements, for instance a telescopically inserted second tube for exposing a greater or smaller portion of the superposed openings 14.

Naturally, the various ways of injecting secondary air described in the foregoing can be combined with each other.

The arrangement described with reference to FIG. 4 is associated with a special advantage in that the primary air flow supplied through the bottom of the reactor can be kept reasonably constant and so dimensioned that the major portion of the largest particles of the solid material, which entail the greatest risk of erosion to the cooling surfaces, can be retained in the bottom section of the reactor to there burn out completely or be reduced in size to finer particles, while substantially the relatively fine solid particles are circulated round the interior of the reactor by the secondary air flow so that separation of the solid material according to particle sizes is obtained during the circulation of the material in the reactor. This way of injection provides the best conceivable possibilities of attaining a satisfactory intermingling and of reducing the volume and height of the dense fluidized bed in the bottom section of the reactor to thereby decrease the total pressure drop in the reactor and the power consumption for the circulation of the solid material.

The process and the reactor according to the invention open up new avenues to a simple supervision as well as a simple and rapid control of the conduction of the exothermal reactions carried out according to the invention. In the following, there is elected as an example of a typical exothermal reaction a combustion reaction between fuel, such as coal or oil, and air in a combustion apparatus or reactor of the type described, it being understood that this selection is not intended to restrict the invention but to be applicable to other exothermal reactions between light gaseous or liquid media and heavy solid or liquid media.

It is previously known and readily realized that the amount of fuel supplied to a combustion apparatus must be adapted to the total heat absorption or power output of the apparatus or reactor. It is also well-known that the total air flow supplied must be controlled according to the need of fuel in the exothermal combustion reaction and that in addition a small amount of excess air must be supplied to yield a well burnt out fuel and exhaust gases having a low content of unburnt constituents.

For realizing a technically and economically acceptable combustion according to the technique of fluidized bed suggested by the present invention a number of further viewpoints have to be considered. Firstly, it is desired that it shall be possible simultaneously with the combustion reaction to be able to bind or catch air-polluting substances accompanying the fuel to the combustion apparatus or formed during the combustion, e.g. sulphur containing substances such as $SO_2$ and $SO_3$. Sulphur can be absorbed by lime which can be supplied to the combustion apparatus together with the fuel or separately. For an effective absorption of sulphur it is necessary to keep the temperature in the combustion apparatus within a narrow temperature interval that is as favourable as possible for the absorption of sulphur.

Furthermore, the total contents of material held in the reactor should be so balanced that incombustible substances and absorption agents supplied with the fuel correspond to an equally large withdrawal of solid material from the reactor, and that the correct contents of material is contained in the reactor. It is particularly difficult to satisfy this desideratum in a circulating fluidized bed reactor as this type of reactor has no exactly defined upper surface of the fluidized bed in contrast to conventional solid fluidized beds, where an excess of solid material is readily withdrawn to a bunker via for instance an overflow.

The above desiderata can simply be satisfied by controlling the circulation of material on the basis of the earlier described technique by suitable air supply to the reactor and suitable distribution of the air supplied to the reactor, and by introducing a principle hereinafter described, which is new in connection with circulating fluidized beds, for measuring the contents of material held in the reactor, said principle offering in addition new possibilities of combining it with otherwise per se known principles so that a fully automatic control of the reactor can be realized.

On the above described basis it can be established that the desired power output from the combustion apparatus can be attained by supplying to the combustion apparatus fuel and air in amounts adapted to said power output and by having the fuel supply control the air supply in the manner known from the steam-boiler technique. The desideratum of thoroughly controlling the temperature can also be satisfied by adjustment of the earlier described air distribution in that the temperature and for instance the temperature gradient in the combustion apparatus is measured. In order that the last-mentioned control shall function in a correct manner it is, however, necessary that there is a total amount of solids in the combustion apparatus, which is correct with regard to grain size distribution and other properties of the solids in the combustion apparatus. This is of importance as variations in grain size and other properties of the solid material supplied to the combustion apparatus can vary as a result of quality deviations. Moreover, it may be necessary to change the type of fuel, for instance oil instead of coal. It is estimated that these deviations result in heavy changes of the reactor function. It is here realized that it is practically difficult directly to measure the contents of material—for instance by weighing the reactor in operation—and that for instance pressure drop measurement, which indirectly conveys an idea of the amount of material in the reactor, does not supply the entire information desired.

The new principle developed comprises measuring the direct heat absorption—heat flow—per surface unit of cooling surface at one or more points of the cooling surface in the height direction of the reactor with the aid of some type of prior art heat flow meter. For each state of operation the information given by the measuremnt can be regularly related to the total function of the reactor and other parameters measured and be used for controlling particularly the withdrawal of solid material from the reactor, which withdrawal is necessary to balance the material supplied.

It is realized that said principle together with the earlier mentioned principle for temperature control gives very good possibilities of automatizing the reactor system which can be based for instance on data processing both in a computer and via normally fixedly coupled control circuits. With the control of the load via fuel supply and methods described for air distribution there is provided a totally seen unique possibility of a rapid and smooth control from low to high load without necessitating any great variation of the total reactor contents of circulating solid material.

What I claim and desire to secure by Letters Patent is:

1. A reactor for conducting exothermal reactions such as combustion, said reactor having lower supply means for supplying relatively heavy phase and a further supply means for supplying relatively light fluidization phase, upper separarting means for separating said phases from one another, return passages for separated heavy phase to the bottom section of the reactor or a region immediately above said bottom section, outlets from the reactor for the relatively heavy and relatively light phases, and cooling surfaces in said reactor, wherein the supply means for said relatively light phase include outlet openings located in the reactor spaced from and facing the reactor side walls and said outlet openings are adjustable in the height direction of the reactor.

2. A reactor as claimed in claim 1, wherein the supply means for the relatively light phase include wind boxes which are mounted in the reactor and in which the lower parts of the cooling surfaces are inserted or above which the cooling surfaces are so arranged that the lower parts of the cooling surfaces are protected from a direct flow against them of the mixture of light and heavy phases from the sections of the reactor below said wind boxes.

3. A reactor as claimed in claim 2, wherein the supply means for the relatively light phase include tubes or passages extending through the bottom of the reactor and movable in their longitudinal direction, said tubes or passages having in their walls outlet openings for the light phase.

4. A reactor as claimed in claim 2, wherein the supply means for the relatively light phase include tubes or passages extending through the bottom of the reactor and having in their walls within the reactor superposed, separately closable openings.

5. A reactor as claimed in claim 4, wherein heat flow meters are built into the cooling surfaces spaced from each other in the height direction of the reactor for controlling the withdrawal of relatively heavy material from the reactor.

6. A reactor as claimed in claim 5 exploited for steam generation or steam superheating in the cooling surfaces.

7. A process of effecting a circulating fluidized bed in a reactor with exothermal reactions such as combustion conducted therein between relatively heavy and relatively light phases, providing vertical cooling surfaces in said reactor for absorption of the reaction heat, continuously supplying the relatively heavy phase to and withdrawing same from the vicinity of the lower end of said reactor to effect a dense conventional part bed, introducing a portion of the light phase into said reactor in the vicinity of the lower end thereof from beneath said dense bed as a primary flow for maintaining said dense bed and another portion of the light phase at the upper part of said dense bed still in the vicinity of the lower end of said reactor as a secondary flow for maintaining a less dense rapid part bed above the dense bed, recycling said rapid part bed outside said bed parts to the dense bed part to effect circulation of said bed, dividing said secondary flow into a plurality of part flows, introducing at least some of said part flows of said secondary flow into and transversely of said circulating bed in a region mainly below said cooling surfaces and within said circulating bed at selective variable heights and with the said part flow that is introduced into said circulating bed being directed from locations in the circulating bed to lateral boundary walls of the dense bed.

8. A process as claimed in claim 7, wherein the mutual relation of said primary and secondary flows is varied for control of the phase load in the fluidized bed.

9. A process as claimed in claim 8, wherein the level of the point of introduction of the secondary flow into the circulating bed is varied for control of the height of the dense part bed.

10. A process according to claims 8 or 9, wherein the primary flow is supplied to the circulating bed divided into several part flows of mutually different flow rates to promote the intermingling of the phases below the cooling surfaces.

11. A process as claimed in claim 10, wherein the heat flow through the cooling surfaces is measured, for determination of the fluidized bed contents of the relatively heavy phase, at spaced points along the cooling surfaces, said measurement being exploited to control the withdrawal of relatively heavy phase from the fluidized bed.

12. A process as claimed in claim 10 for process media heating, for instance steam generation or steam superheating in the cooling surfaces, wherein coal or oil is selected as part of the relatively heavy phase, and air is selected as part of the relatively light phase.

13. A process as claimed in claim 12, wherein an absorbent for sulphur containing gases is selected as part of the relatively heavy phase.

* * * * *